(12) United States Patent
Yonekawa

(10) Patent No.: US 8,676,049 B2
(45) Date of Patent: Mar. 18, 2014

(54) IMAGING CONTROL UNIT, IMAGING APPARATUS, AND IMAGING CONTROL METHOD

(75) Inventor: Takaaki Yonekawa, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 81 days.

(21) Appl. No.: 13/195,842

(22) Filed: Aug. 2, 2011

(65) Prior Publication Data

US 2012/0106938 A1 May 3, 2012

(30) Foreign Application Priority Data

Nov. 1, 2010 (JP) ................................. 2010-245381

(51) Int. Cl.
*G03B 17/00* (2006.01)
(52) U.S. Cl.
USPC ............................................ 396/82; 348/352
(58) Field of Classification Search
USPC ........................................... 348/352; 396/82
See application file for complete search history.

(56) References Cited

U.S. PATENT DOCUMENTS

| 5,404,013 | A | 4/1995 | Tajima |
| 5,798,793 | A * | 8/1998 | Tanaka .......................... 348/347 |
| 2008/0055457 | A1 * | 3/2008 | Nakahara ..................... 348/335 |
| 2008/0310830 | A1 | 12/2008 | Pan et al. |
| 2010/0157065 | A1 * | 6/2010 | Yata ............................. 348/169 |

FOREIGN PATENT DOCUMENTS

| JP | 3500539 | 12/2003 |
| JP | 2008-309947 A | 12/2008 |

* cited by examiner

*Primary Examiner* — Rodney Fuller
*Assistant Examiner* — Fang-Chi Chang
(74) *Attorney, Agent, or Firm* — Fujitsu Patent Center

(57) ABSTRACT

An imaging control unit includes: a detecting unit that detects a focused-status of a focus detecting range set to an image data of each frame; a setting unit that sets, at a position of a distinctive-region including a distinctive points of an object detected from an processed image data, a focus detecting range of an image data of a subsequent frame; and a control unit that performs, when the focus detecting range is not in focused-status, a focal length control to change a focal length of a imaging lens so that the focus detecting range is in focused-status. When a displacement amount from the focus detecting range set to the imaged image data to the distinctive-region detected in the processed image data based on the imaged image data is large, the control unit aborts performing the focal length control even when the focus detecting range is not in focused-status.

11 Claims, 6 Drawing Sheets

IMAGING CONTROL UNIT, IMAGING APPARATUS, AND IMAGING CONTROL METHOD

CROSS-REFERENCE TO RELATED APPLICATION

This application is based upon and claims the benefit of priority of the prior Japanese Patent Application No. 2010-245381, filed on Nov. 1, 2010, the entire contents of which are incorporated herein by reference.

FIELD

Embodiments discussed herein relate to an imaging control unit, an imaging apparatus, and an imaging control method.

BACKGROUND

With regard to an imaging apparatus, such as a digital still camera, an auto-focus for automatically focusing an object preferred by a user is known (for example, Japanese Unexamined Patent Publication No. 2008-309947, and Japanese Patent Publication No. 3500539). The auto-focus includes a single auto-focus for focusing an object one time, a continuous auto-focus for continuously maintaining focused-status after the single auto-focus.

When performing the single auto-focus, an imaging apparatus sets a focus detecting range in a frame (for example, the center of the frame). When the user commands performing the single auto-focus with a preferred object captured in the focus detecting range, the imaging apparatus, changing a focal length of a lens, images in a plurality of the frames. Then, the imaging apparatus, by detecting whether the focus detecting range in the imaged image data is in the focused-status or not, detects the focal length of a lens for focusing on the object, and moves the lens to and fixes it at the focal length. The single auto-focus is performed, at a time of a focus adjustment before imaging a still-image, or immediately after starting imaging a moving-image.

When performing the continuous auto-focus, the imaging apparatus monitors the focused-status of the focus detecting range of the imaged image data in every frame, and, if the focused-status is lost by a displacement of the object, the imaging apparatus performs the single auto-focus. Further, in resent years, an imaging apparatus is proposed which performs an object following continuous auto-focus, whereby the focus detecting range follows an object which displaces from frame to frame.

However, when the continuous auto-focus is performed and the displacement amount of an object is large, there occurs a case that the object is not included in the focus detecting range (or the area included therein is small) despite of the object being included in the frame. In case that the object following continuous auto-focus is performed, processes are necessary such as detecting an object in each frame, and, according to the position thereof, setting the focus detecting range. Therefore, setting the focus detecting range delays by the time required for such a process, and there can be a case that, when the focus detecting range is set, the position of the object displaces from the focus detecting range.

In case that the object is not included in the focus detecting range, if the single auto-focus is performed according to the focused-status of the focus detecting range, not the preferred object but a background in a distance, for example, is focused.

SUMMARY

According to an aspect of an embodiment, an imaging control unit includes: a detecting unit that detects a focused-status of a focus detecting range set to an image data of each frame; a setting unit that sets, at a position of a distinctive-region including a distinctive points of an object detected from an processed image data, which is the image data through an image processing, a focus detecting range of an image data of a subsequent frame; and a control unit that performs, when the focus detecting range is not in focused-status, a focal length control to change a focal length of a imaging lens so that the focus detecting range is in focused-status. When a displacement amount from the focus detecting range set to the imaged image data to the distinctive-region detected in the processed image data on the basis of the imaged image data is larger than a reference value, the control unit aborts performing the focal length control when the focus detecting range is not in focused-status.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will be described hereinafter according to the drawings. However, it is noted that the technical scope is not limited to the embodiments described below, but covers the matters described in the claims and the equivalents thereof.

Figure 1:
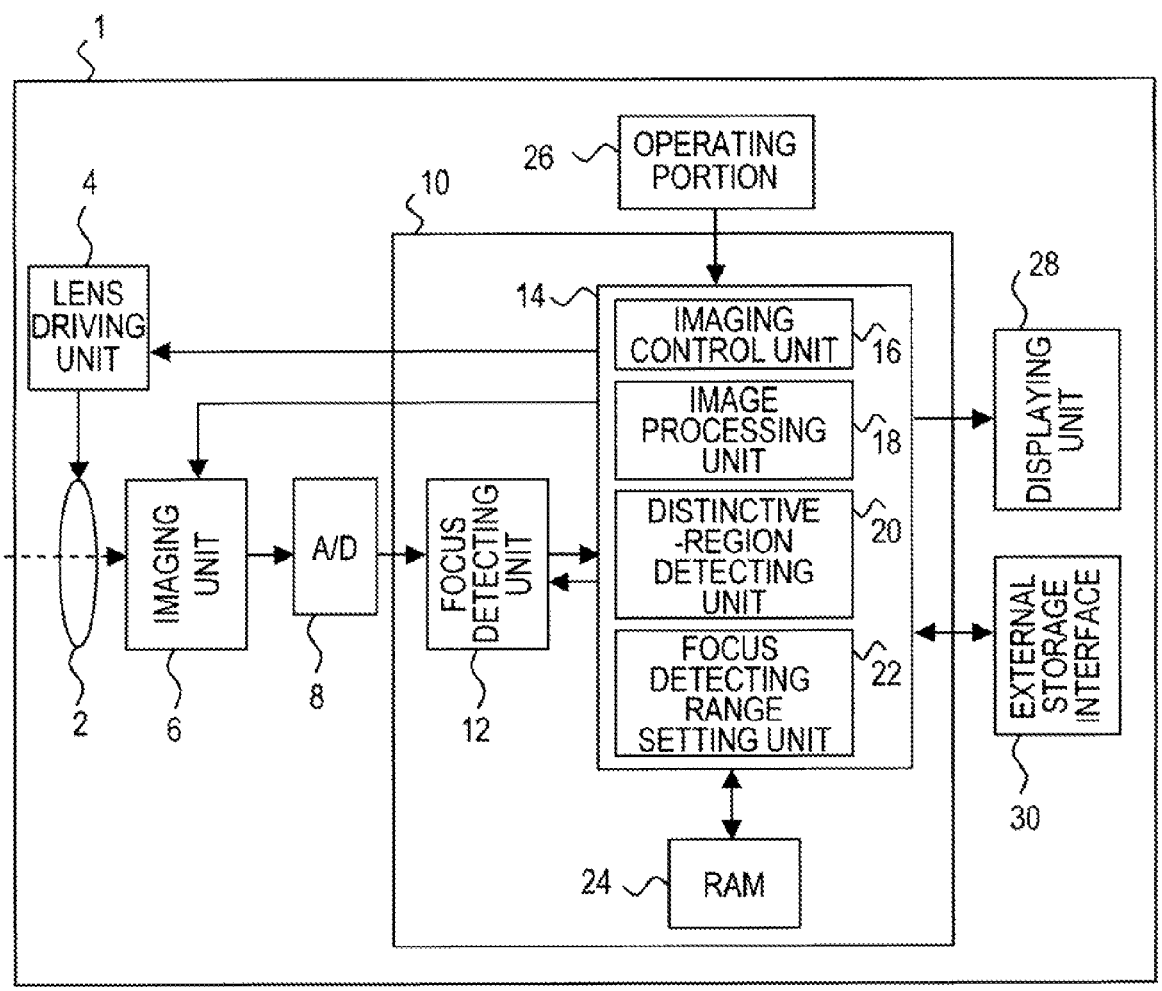
FIG. 1 is a drawing for illustrating a configuration of an imaging apparatus and its imaging control unit.

FIG. 1 is for illustrating a configuration example of an imaging apparatus and an imaging control unit thereof in accordance with the present embodiment. This imaging apparatus 1 includes an imaging control unit 10 which processes an imaged image data and controls an imaging.

At the imaging apparatus 1, a light from an object is input to an imaging lens 2. The imaging lens 2 includes, for example, a plurality of single-focus lenses. A lens driving unit 4 adjusts a focal length by moving the lenses of the imaging lens 2. The lens driving unit 4 includes, for example, a stepping-motor, by which the distance between the lenses is changed along the direction of the light axis of the imaging lens 2, and thus the focal length being changed. Then the light thorough the imaging lens 2 is input to an imaging unit 6 and forms an object image. The imaging unit 6 converts the received light into analog pixel value signals. The imaging unit 6 includes, for example, a CCD (Charge Coupled Device) sensor, or a CMOS (Complementary Metal Oxide Semiconductor) sensor.

The pixel value signals output from the imaging unit 6, are input into an A/D converter 8. The A/D converter 8 converts the pixel value signals into digital signals and outputs them. The pixel value signals converted into digital signals are input as an imaged image data into an imaging control unit 10. The imaged image data includes, for example, RGB (Red, Green, and Blue) data.

At the imaging control unit 10, the imaged image data is input into a focus detecting unit 12. The focus detecting unit 12 detects a focused-status of a focus detecting range, which is set in an imaged image data of a frame, and outputs the imaged image data and the detected focused-status. The focus detecting unit 12 includes, for example, a high-pass-filter, by which an amount of high-frequency component (contrast value) among spatial frequencies in the focus detecting range is detected as the focused-status. The imaged image data of each frame is stored, by a processing unit 14, into a RAM (Random Access Memory) 24. The RAM 24 includes, for example, DRAM (Dynamic RAM). Also the focused-status is input into the processing unit 14.

The processing unit 14 includes, for example, a general-purpose CPU (Central Processing Unit), a DSP (Digital Signal Processor) or the like, for performing various kinds of processing programs. An imaging control unit 16, an image processing unit 18, a distinctive-region detecting unit 20, and a focus detecting range setting unit 22 are functions performed by the CPU or the DSP.

The image processing unit 18 reads out the imaged image data stored in the RAM 24 and performs an image processing to generate a processed image data. The image processing unit 18 performs, for example, image processings, such as a conversion of an RGB data into a YUV (brightness-color difference) data, a correction of a color or a brightness, a noise rejection, or an enhancement of a contour; a format conversion process for compressing data; or, a generation of a minified image data by performing a minifying process of an imaged image data of a frame. Here, the processed image data is, for example, a minified image data having a smaller amount of data than that of an imaged image data. By generating the minified image data which has a small amount of data, the efficiency of a subsequent process performed by the distinctive-region detecting unit 20 improves.

The distinctive-region detecting unit 20 detects a distinctive-region of the object of the minified image data. The distinctive-region is, for example, a region including distinctive points, such as, in case of a human face being an object, eyes, mouth or the like. The focus detecting range setting unit 22 sets, at the position of the distinctive-region detected in one frame, the focus detecting rang in the imaged image data of the subsequent frame. The focus detecting range setting unit 22 inputs a signal indicating the focus detecting range being set to the focus detecting unit 12.

The imaging control unit 16 performs, together with the control of the imaging of the imaging unit 6 according to the focused-status of the focus detecting range, focal length control for controlling changing operation of the focal length of the imaging lens 2 by the lens driving unit 4. For example, the imaging control unit 16 generates a control signal commanding the imaging unit 6 to image, and outputs it to the imaging unit 6. Adding to this, the imaging control unit 16 generates a control signal commanding operation of the imaging lens 2, and outputs it to the lens driving unit 4. Thereby, the single auto-focus is performed for changing the focal length of the imaging lens so that the focus detecting range becomes the focused-status.

In the above description, a case is illustrated that a single processing unit 14 functions as the imaging control unit 16, the image processing unit 18, the distinctive-region detecting unit 20, and the focus detecting range setting unit 22. However, such a case is also included in the present embodiment that more than one of the imaging control unit 16, the image processing unit 18, the distinctive-region detecting unit 20, and the focus detecting range setting unit 22 is/are performed by a CPU or a DSP out of the processing unit 14, and that the data is transmitted/received in between the CPU or the DSP and the processing unit 14. For example, the image processing unit 18 is performed by other CPU or DSP, and the processed image data is provided to the processing unit 14. Also, the image processing unit 18 and the distinctive-region detecting unit 20 are performed by other CPU or DSP, a size or a position of the detected distinctive-region is provided to the processing unit 14.

The operating portion 26 receives an operation input by the user, and inputs a control signal corresponding to the operation input into the imaging control unit 10. The operating portion 26 includes, for example, various kinds of operation button and a controlling circuit thereof. At the imaging control unit 10, a control signal from the operating portion 26 is input into the processing unit 14. And the imaging control unit 16 controls the imaging unit 6, the lens driving unit 4, and the like, in response to such a control signal. Thereby, the imaging apparatus 1 performs imaging, in response to the user input.

Also, the imaging control unit 10 outputs the minified image data to a displaying unit 28. The displaying unit 28 displays a finder image corresponding to the minified image data. The displaying unit 28 includes, for example, an LCD (Liquid Crystal Display) and a controlling circuit thereof. Also, the imaging control unit 10 outputs the imaged image data to an external storage interface 30. The external storage interface 30 reads a data from or writes a data to an external storage medium. By the external storage interface 30, for example, the imaged image data is written to an external storage medium. The external storage medium includes, for example, a USB (Universal Serial Bus) memory, a memory card, or the like.

The imaging apparatus 1 as above performs the single auto-focus for focusing imaging lens 2 at the object at one time, and the continuous auto-focus for maintaining the focused-status of a plurality of frames. Further, the imaging apparatus 1 performs the object following continuous auto-focus, for having the focus detecting range of each frame follow an object during the continuous auto-focus.

The imaging apparatus 1 performs the single auto-focus, for example, during the focus adjustment before imaging a still-image. The imaging apparatus 1, for example, when a shutter button is half-pressed by the user, performs the single auto-focus, in response thereto. Or, the imaging apparatus 1, when imaging moving-image having imaged image of a series of frames, performs the single auto-focus. The imaging apparatus 1, for example, when a command to start imaging a moving-image is input by the user, in response thereto, performs the single auto-focus immediately after imaging starts.

Figure 2A:
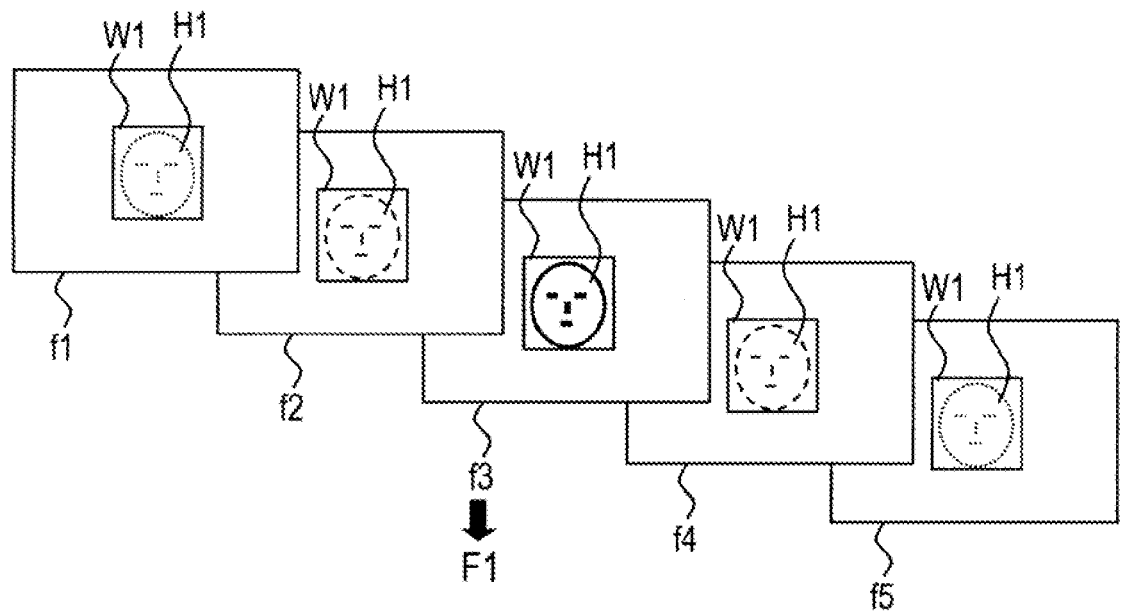
FIGS. 2A and 2B are drawings for illustrating a single auto-focus.
Figure 2B:
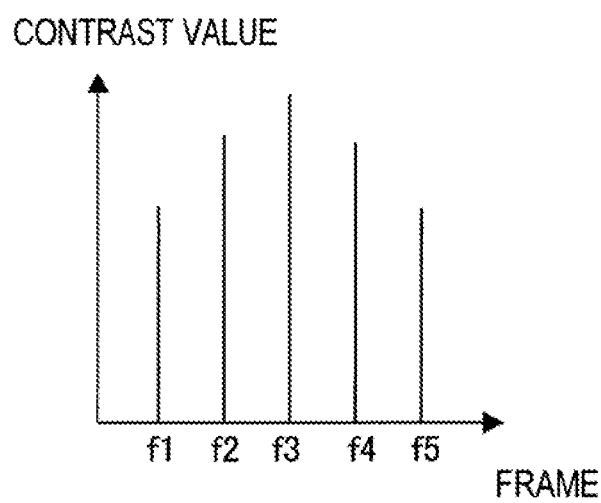

FIGS. 2A and 2B are drawings for illustrating the single auto-focus. FIG. 2A illustrates examples of imaged image data which are imaged in the single auto-focus. The imaging apparatus 1, increasing (or decreasing) the focal length of the imaging lens 2 one step after another, images, for example, image data of frames f1-f5. For example, imaging is performed at a speed of tens of frames per second. In each of the frames, a focus detecting range W1, for example, is set at the center of a frame as the initial setting. In case of the single auto-focus, the same focus detecting range W1 is set in frames f1-f5. Here, an example is described, in which a human face is imaged as an object H1 in the focus detecting range W1.

At this time, the imaging control unit 16 generates a control signal to have the lens driving unit 4 change the focal length of the imaging lens 2 step by step, and outputs it to the lens driving unit 4. Together with this, the imaging control unit 16, corresponding to different focal lengths, generates a control signal to have the imaging unit 6 perform an imaging, and outputs it to the imaging unit 6. Thereby, imaged image data of the frames f1-f5 are imaged one after another, and are input into the focus detecting unit 12 of the imaging control unit 10. The focus detecting unit 12 detects, as the focused-status of the focus detecting range W1, for example, a contrast value. Here, the focus detecting unit 12 detects the contrast value constituting the object H1.

FIG. 2B illustrates the focused-status of the focus detecting range W1 of each of the frames f1-f5. For example, the contrast values of focus detecting range W1 of each of the frames f1-f5 are described. The imaging control unit 16 monitors such contrast values as described here.

The horizontal axis represents imaged frames according to the time axis, and the vertical axis represents the contrast value. In case that imaging is performed with the focal length being increased (or decreased) in order of the frames f1-f5, the focused-status of the focus detecting range W1 is changed according to the each focal length. For example, the contrast value of the focus detecting range W1 gradually increases, and decreases gradually after peaking, for example, at frame f3. This indicates that, the focus detecting range W1 is in the focused-status at the imaged image data of the frame f3. That is, at the frame f3, the object H1 is in a focused-status. Therefore, the focal length when imaging the image data of the frame f3 is the focal length at which the object H1 of the focus detecting range W1 is focused.

The imaging control unit 16 generates a control signal for having the lens driving unit 4 maintain the focal length by which the frame f3 is imaged, and outputs it to the lens driving unit 4. The lens driving unit 4, in response thereto, drives imaging lens 2 to the focused focal length and maintains the focused focal length. Thereby, the single auto-focus is performed.

Further, among the image data of the frames f1-f5 imaged at the time of the single auto-focus, the imaged image data of the frame 3 of the focused-status is adopted as an image data for being displayed as a finder image or as an image data of a moving-image, and the image data of the other frames f1, f2, f4, and f5 are discarded. Then, the frame f3, of which the image data is adopted, being as the frame F1, the continuous auto-focus is performed so that the focused-status of the objects in the subsequent frames F2, F3, . . . are maintained.

The continuous auto-focus, in a focus adjustment when a still-image is imaged, is performed after the single auto-focus. Or, it is performed, in imaging a moving-image, following the single auto-focus immediately after the imaging starts.

In the continuous auto-focus, the imaging apparatus 1 monitors whether or not the focused-status at the time of the frame F1 is maintained in the focus detecting ranges of the subsequent frames to the frame F1. Then, when the focused-status is lost, the imaging apparatus 1 performs the above described single auto-focus, so that the focus detecting range becomes the focused-status. Here, the object following continuous auto-focus will be explained, whereby the focus detecting range follows the object from frame to frame.

Figure 3A:
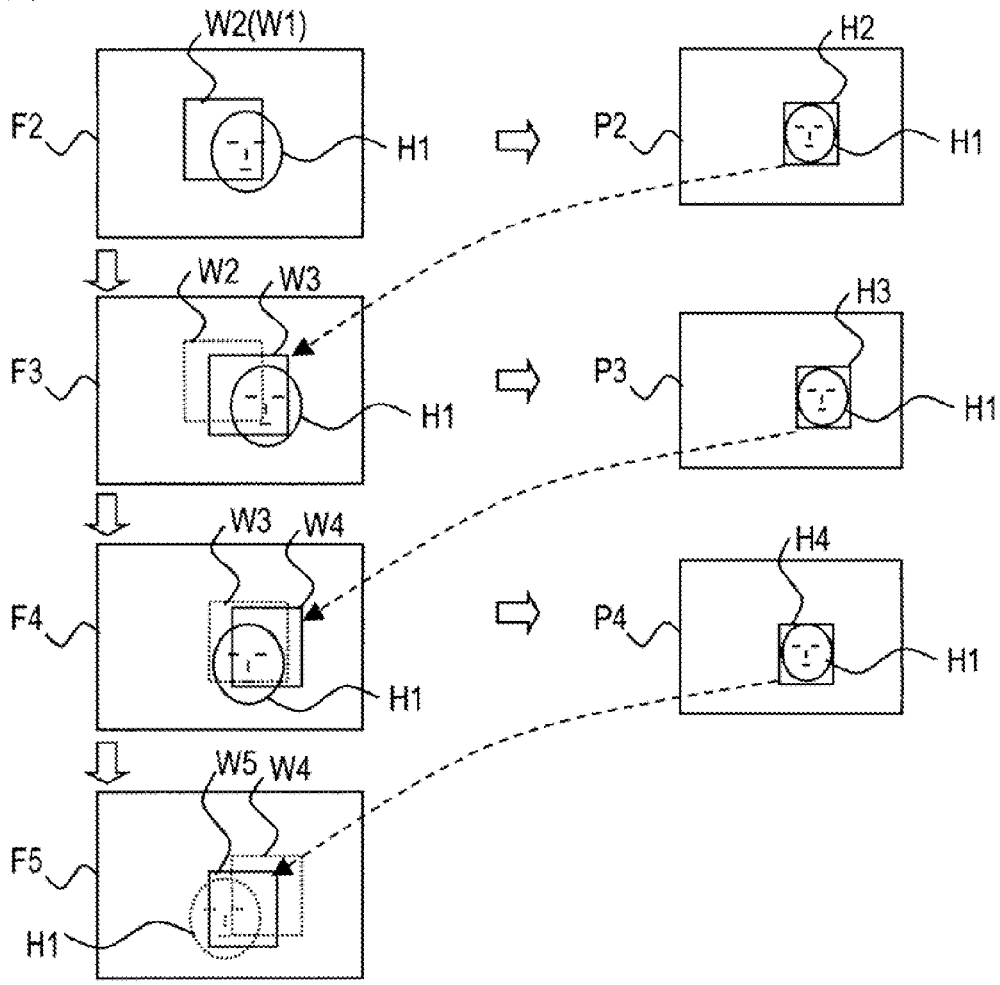
FIGS. 3A-3C are drawings for illustrating an object following continuous auto-focus.
Figure 3B:
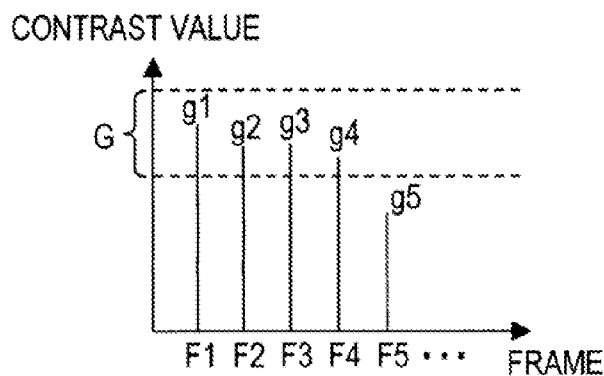
Figure 3C:
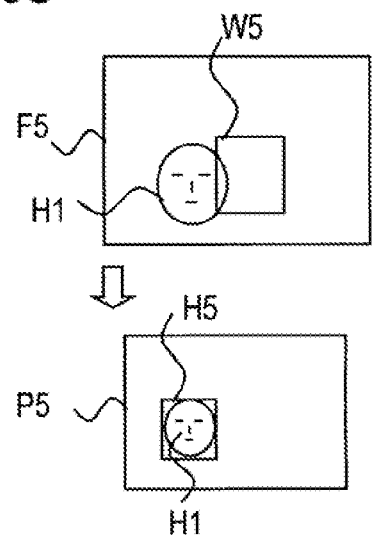

FIGS. 3A-3C are drawings for illustrating the object following continuous auto-focus. In FIG. 3A, imaged image data of frames F2-F5 subsequent to a frame F1 (the frame f3 in FIG. 2A), and minified image data P2-P4 which are generated at each of the frames F2-F4 are illustrated.

For the imaged image data of the frame F2, the focus detecting range W1 which was set for the imaged image data of the frame F1 is set as the focus detecting range W2. Here, an example is illustrated, in which a human face is imaged as the object H1. The object H1 displaces in the vertical direction to the focus direction of the imaging apparatus 1, with the focal length being consistent, that is, the focused-status is maintained. Then, the object H1 displaces from its position at the time of the frame F1, and is imaged at a position slightly out of the focus detecting range W2.

The image processing unit 18 generates a minified image data P2 from the imaged image data of the frame F2. Then, the distinctive-region detecting unit 20 detects, from the minified image data P2, a distinctive-region H2, which includes distinctive points of the object H1. The distinctive-region H2 is a region of an object which includes distinctive points of the object, for example, eyes or a mouth of a human face as an object. At this time, for example, the distinctive-region detecting unit 20 scans the minified image data P2, detects the object H1 by matching with a previously obtained image pattern of a human face, and detects the distinctive-region H2 thereof. The image pattern for matching is stored, for example, in a ROM (Read Only Memory) or the like in the processing apparatus 10. The matching is performed according to, for example, a pixel color.

Then, the focus detecting range setting unit 22 sets, at the position of the detected distinctive-region H2, a focus detecting range W3 of the subsequent frame F3. At this time, for example, an offset, based on the size ratio of the minified image data P2 to the imaged image data of the frame F3, is added to the size or the position of the distinctive-region H2 detected at the minified image data P2. Thereby, the size and the position of the focus detecting range W3 in the imaged image data of the frame F3 are calculated. A marginal region may be added to the distinctive-region H2, so that the focus detecting range W3 is set wider to some extent.

In the frame F2, the object H1 is imaged at a position slightly out of the focus detecting range W2, however, by setting the focus detecting range W3 of the frame F3 at the position of the distinctive-region H2 of the minified image data P2, the focus detecting range is set to follow the object. For example, in the frame F3, the focus detecting range W3 is set at the position displaced from the focus detecting range W2 by the amount of the displacement of the object H1.

Then, in the imaged image data of the frame F3, the object H1 is further displaced, and imaged at a position displaced to some extent from the focus detecting range W3 . Then, the distinctive-region detecting unit 20 detects, in the similar manner to the above, a distinctive-region H3 of the object H1 at the minified image data P3. Then, the focus detecting range setting unit 22 sets a focus detecting range W4 of the subsequent frame F4 at a position of the distinctive-region H3. Here, in the frame F4, a focus detecting range W4 is set at a position which is displaced from the focus detecting range W3 by the amount of the displacement of the object H1.

Also, in the imaged image data of the frame F4, the object H1 is further displaced, and is imaged at a position slightly displaced from the focus detecting range W4. Then, the distinctive-region detecting unit 20 detects, in the similar manner to the above, a distinctive-region H4 of the object H1 at the minified image data P4. Then, the focus detecting range setting unit 22 sets, at the position of the distinctive-region H4, a focus detecting range W5 of the subsequent frame F5. Here, in the frame F5, a focus detecting range W5 is set at a position which is displaced from the focus detecting range W4 by the amount of the displacement of object H1.

As the above, the focus detecting ranges are set one after another following the object which is displaced from frame to frame.

Here, when the frame F5 is imaged, the object H1 is displaced along the focus direction. Then, in the imaged image data of the frame 5, most part of the object H1 is included in the focus detecting range W5, but the focused-status of the object H1 is lost. Here, the focused-status of the focus detecting ranges W1-W5 of the frames F1-F5 are illustrated in FIG. 3B.

In FIG. 3B, the horizontal axis represents the frames F1-F5 imaged along the time axis, and the vertical axis represents the contrast value. The imaging control unit 16 monitors the contrast value illustrated here.

In the frame F1, the object H1 is included in the focus detecting range W1, and a contrast value g1 is detected in the focus detecting range W1. Here, the contrast value g1 being as a reference, range G of the contrast value indicating the focused-status is set. Such range G is obtained by an experiment or the like, as a range which is considered to be in the focused-status. For example, the range G indicating the focused-status is set as such a range that, if the contrast value is therein, the distinctive-region of the object H1 is accurately detected according to a pixel color.

In the subsequent frames F2-F4, since the object H1 is slightly displaced from the focus detecting ranges W2-W4, contrast values g2-g4, despite of being slightly smaller than the contrast value g1 detected in the frame F1, are detected in the range G indicating the focused-status. However, in the frame F5, since the object H1 is displaced along the focus direction, a contrast value g5 of the focus detecting range W5 decreases out of the range G indicating the focused-status.

Therefore, imaging control unit 16 performs, when the focused-status is lost as in the frame F5, a process for the single auto-focus on the basis of the contrast value of the focus detecting range W5. For example, the focal length of the imaging lens 2 is adjusted, so that the focus detecting range W5 becomes the focused-status. Thereby, the imaging apparatus 1 again focuses on the object H1. After that, the imaging apparatus 1 returns to the steps of the object following continuous auto-focus.

In the above described object following continuous auto-focus, if the object H1 displaces largely along the vertical direction to the focus direction with the focal length being consistent, there occurs a case that the object H1 is included in the frame being focused, but not included in the focus detecting range (or the included area is small). For example, in the image data of the frame F5 illustrated in FIG. 3C, the object H1 is displaced largely out of the focus detecting range W5, and barely included therein. At this time, despite of the object H1 being focused, the contrast value detected in the focus detecting range W5 decreases out the range G indicating the focused-status, as illustrated in FIG. 3B. However, if the single auto-focus is performed at this time, other object than object H1, such as a background, is focused in the focus detecting range W5.

In the present embodiment, when the displacement amount from the focus detecting range of the imaged image data to the distinctive-region detected in a processed image data based on the imaged data is larger than a reference value, the imaging control unit 16 does not perform the single auto-focus, even if the focus detecting range is not in the focused-status. For example, as illustrated in FIG. 3C, in which a minified image data P5 generated from the imaged image data of the frame F5 and a distinctive-region H5 of the object H1 detected in the minified image data P5 are illustrated, when the displacement amount from the focus detecting range W5 to the distinctive-region H5 is large, despite of the object H1 being included in the frame F5 but not in the focus detecting range W5 (or the included area being small), the probability becomes large that the focus detecting range W5 does not indicate the focused-status. Thus, in this case, by aborting performing the single auto-focus, such a case is avoided that other objects than the object H1, such as the background, is focused while the object H1 being defocused. Therefore, a focused imaged image, in which the object H1 is focused, is obtained with certainty.

Next, the displacement amount from the focus detecting range to the distinctive-region will be explained. In the present embodiment, the distinctive-region is detected in the minified image data. Therefore, the position and the size of the distinctive-region is converted according to the size of the imaged image data before minimized, and the displacement amount from the focus detecting range to the distinctive-region is calculated. Here, in the present embodiment, by the focus detecting range of the subsequent frame being set at the position of the distinctive-region, the displacement amount from the focus detecting range of the present frame to the focus detecting range to be set in the subsequent frame is used as the displacement amount from the focus detecting range to the distinctive-region.

Figure 4A:
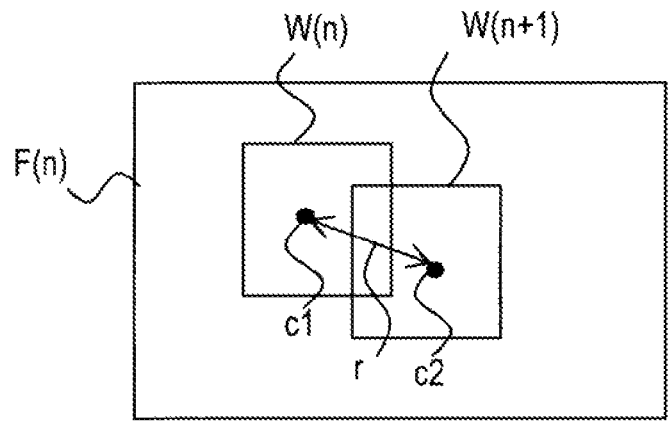
FIGS. 4A-4C are drawings for illustrating a displacement amount from a focus detecting range to a distinctive-region.
Figure 4B:
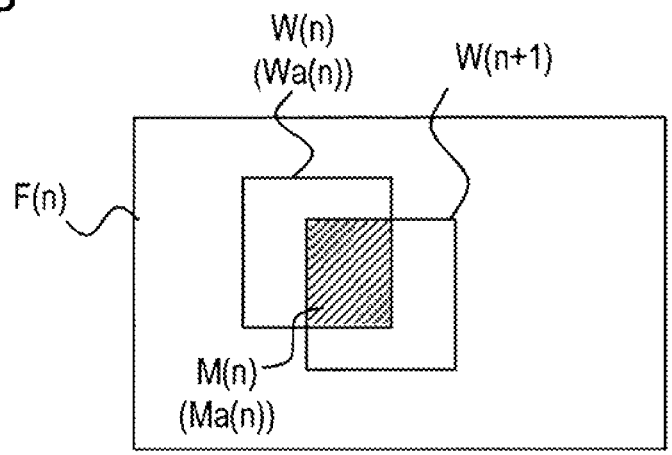
Figure 4C:
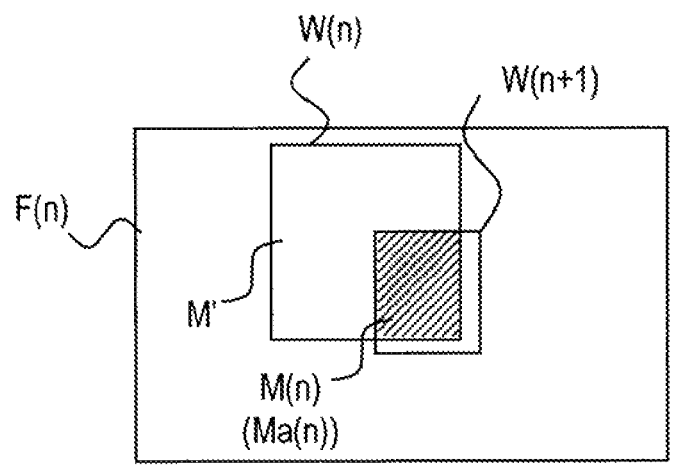

FIGS. 4A-4C are drawings for illustrating the displacement amount from the focus detecting range to the distinctive-region. In FIGS. 4A-4C, a focus detecting range W(n), which is set in imaged image data of a frame F(n) (n=2, 3, 4), and a focus detecting range W(n+1), which is the distinctive-region detected in the minified image data of the frame F(n) and set in the imaged image data of frame F(n+1), are illustrated.

FIG. 4A illustrates a first example. In the first example, the displacement amount from the focus detecting range to the distinctive-region, is a distance between arbitrary positions in the focus detecting ranges W(n) and W(n+1), for example, a distance r between the center c1 of the focus detecting range W(n) and the center c2 of the focus detecting range W(n+1).

In this case, the imaging control unit 16 compares the distance r with a threshold value. Such a threshold value is previously calculated, for example, by an experiment or the like. Here, a case that the displacement amount from the focus detecting range to the distinctive-region is larger than the reference value is such a case that the distance r is larger than the threshold value.

For example, when the distance r is smaller than the threshold value, the probability of the object being included in the focus detecting range W(n) is large. Therefore, the imaging control unit 16 performs the single auto-focus, if the focus detecting range W(n) is not in the focused-status. On the other hand, when the distance r is larger than the threshold value, the probability of the object being not included in the focus detecting range W(n) is high, and thus the single auto-focus is not performed, even if the focus detecting range W(n) is not in the focused-status.

FIG. 4B illustrates a second, and a third examples. In the second example, the displacement amount from the focus detecting range to the distinctive-region is an amount which is inversely proportional to an area Ma(n) of an overlapping region M(n) of the focus detecting range W(n) and the focus detecting range W(n+1). That is, as the displacement amount from the focus detecting range to the distinctive-region is large, the area Ma(n) of the overlapping region M(n) is small. And, as the displacement amount from the focus detecting range to the distinctive-region being small, the area Ma(n) of the overlapping region M(n) is large. The imaging control unit 16 compares the area Ma(n) with a threshold value previously calculated by an experiment or the like. Here, a case that the displacement amount from the focus detecting range to the distinctive-region is larger than the reference value is such a case that the area Ma(n) is smaller than the threshold value.

For example, if the area Ma(n) is larger than the threshold value, the probability of the object being included in the focus detecting range W(n) is large. Therefore, the imaging control unit 16 performs the single auto-focus, when the focus detecting range W(n) is not in the focused-status. On the other hand, when the area Ma(n) is smaller than the threshold value, the probability of the object being not included in the focus detecting range W(n) is large, and thus the performance of the single auto-focus is aborted, even when the focus detecting range W(n) is not in the focused-status.

Further, in the third example, an area ratio of the area Ma(n) of the overlapping region M(n) to the area Wa(n) of the focus detecting range W(n) being R (=Ma(n)/Wa(n)), the displacement amount from the focus detecting range to the distinctive-region is an amount which is inversely proportional to the area ratio R. The imaging control unit 16 compares the area ratio R with a threshold value previously calculated by an experiment or the like. Here, a case that the displacement amount from the focus detecting range to the distinctive-region is larger than the reference value is such a case that the area ratio R is smaller than the threshold value.

For example, when the area ratio R is larger than the threshold value, the probability of the object being included in the focus detecting range W(n) is large. Therefore, the imaging control unit 16 performs the single auto-focus, when the focus detecting range W(n) is not in the focused-status. On the other hand, if the area ratio R is smaller than the threshold value, the probability of the object being not included in the focus detecting range W(n) is small, and thus the performance of the single auto-focus is aborted, even if the focus detecting range W(n) is not in the focused-status.

Here, in the first and the second embodiments, if the sizes of the focus detecting ranges W(n) and W(n+1) are consistent, a magnitude of the probability of the object being located out of the focus detecting range W(n) is consistently evaluated according to the distance r between the focus detecting ranges or the overlapping area Ma(n). Further, in the third embodiment, by evaluating the area Ma(n) of the overlapping region M(n) by the area ratio R with the area of the focus detecting range W(n) being as a reference, the probability of the object being included/not included in the focus detecting range W(n) is accurately determined, even when the size of the focus detecting range changes according to the size of the object.

For example, as illustrated in FIG. 4C, when the focus detecting range W(n) is larger than the focus detecting range W(n+1), there may be a case that the area of a non-overlapping region M' of the focus detecting range W(n) and the focus detecting range W(n+1) becomes larger than some extent relative to the area of the focus detecting range W(n). Nevertheless, if the distance r between the centers of focus detecting ranges is larger than the threshold value, or if the overlapping area Ma(n) is larger than the threshold value, the probability of the object being included in the focus detecting range W(n) is determined to be large. Then, when the focus detecting range W(n) is not in the focused-status, the single auto-focus is performed.

However, as the area of the non-overlapping region M' becomes larger than some extent relative to the area of the focus detecting range W(n), a ratio that the contrast value detected in the focus detecting range W(n) depends to an object in the non-overlapping region M' becomes large. Therefore, for example, in case that the background or the like is included in the non-overlapping region M, there may be a case that, despite of the object being focused, the focused-status is not indicated. In that case, if the single auto-focus is performed, no object but the background is focused.

In this regard, with respect to the area ratio R of the overlapping region M(n), when the area ratio R is large, the non-overlapping region M' is small, and, when the area ratio R is small, the non-overlapping region M' is large. Therefore, in accordance with the third embodiment, by the area ratio R being a reference, even in a case that the sizes of the focus detecting ranges W(n) and W(n+1) are not consistent, the probability of the object being included/not-included in the focus detecting range W(n) is accurately determined.

Therefore, for example, in case that the sizes of the focus detecting ranges W(n) and W(n+1) are not consistent, if the area ratio R is large, the probability of a object being included in the focus detecting range W(n) is determined to be large, and thus, in a performance of the single auto-focus, the object is accurately focused. On the other hand, when the area ratio R is small, the probability of the object being not included in the focus detecting range W(n) is determined to be large, or, even when an object is included in the focus detecting range W(n), the ratio of the background is determined to be large. Therefore, by aborting the performance of the single auto-focus and performing the single auto-focus, such a case that the background is focused is avoided. Therefore, an imaged image with a focus being on the object is obtained more accurately and with higher certainty.

Figure 5:
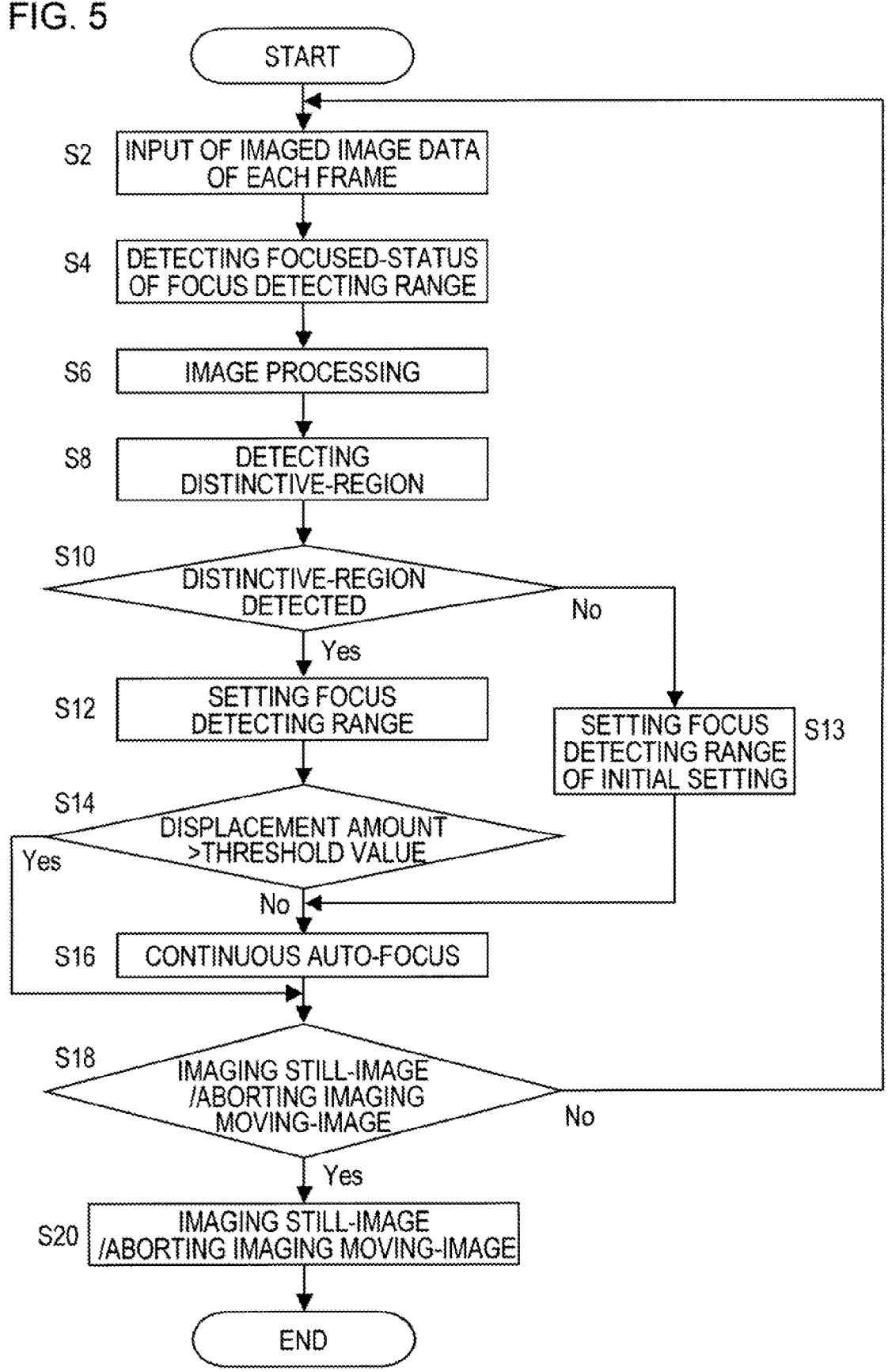
FIG. 5 is a flow-chart diagram for illustrating operation steps of an imaging control unit.
Figure 6A:
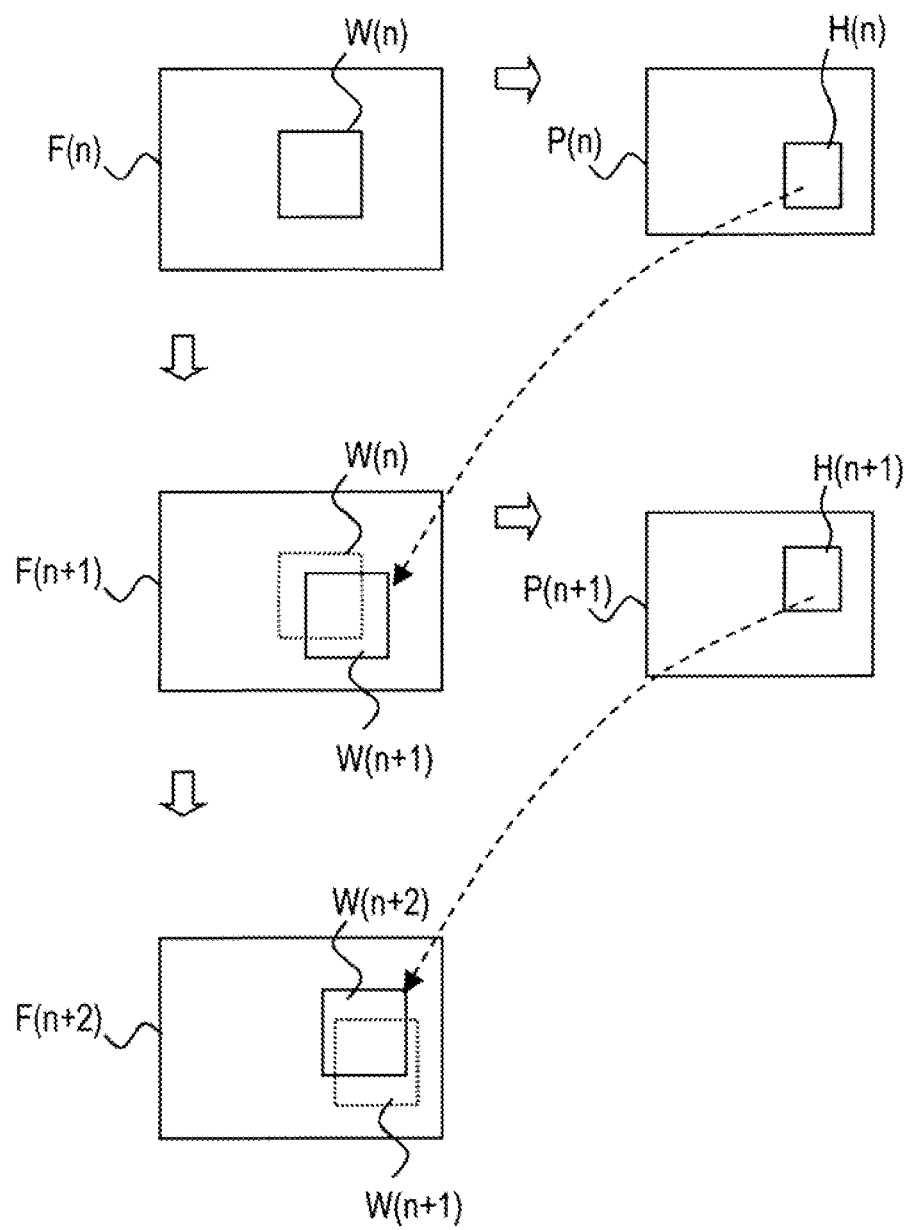
FIGS. 6A and 6B are drawings for illustrating examples of imaged image data and focus detecting ranges.
Figure 6B:
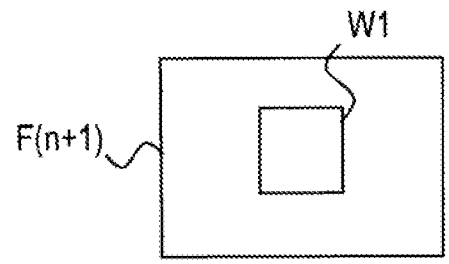

FIG. 5 is a flow-chart diagram for explaining operation steps of the imaging control unit 14 in the present embodiment. These operation steps correspond to operation steps in the continuous auto-focus being performed after finishing the single auto-focus. FIGS. 6A and 6B are diagrams for illustrating examples of the imaged image data and the focus detecting range. Steps in FIG. 5 are explained occasionally by referring to FIGS. 6A and 6B.

The imaging control unit 14, when an imaged image data of each frame is input (Step S2), detects the focused-status of the focus detecting range(Step S4). For example, as illustrated in FIG. 6A, when an imaged image data of a frame F(n) is input, the focus detecting unit 12 detects the contrast value of a focus detecting range W(n). Here, the focus detecting range W(n) is a distinctive-region detected in the frame previous to the frame F(n).

Then, image processing unit 18 performs image processing (Step S6), and generates a processed image data. For example, as illustrated in FIG. 6A, the image processing unit 18 generates, from imaged image data of the frame F(n), a minified image data P(n). Then, the distinctive-region detecting unit 20 detects the distinctive-region (Step S8). For example, the distinctive-region detecting unit 20 detects, from the minified image data P(n), the distinctive-region H(n).

When the distinctive-region is not detected ("No" at Step S10), the focus detecting range setting unit 22 sets a focus detecting range of the initial setting in the next frame (Step S13). For example, the focus detecting range setting unit 22 sets, as illustrated in FIG. 6B, a focus detecting range W1 of the initial setting at the center of a frame F(n+1). Then, at Step S16, the imaging control unit 16 controls an imaging, in such a manner that the normal continuous auto-focus is performed (Step S16). At this time, since an object is not detected, for example, the single auto-focus is performed so that the focus detecting range W1 is in the focused-status, and a new object is detected. Then, the process progresses to Step S18.

On the other hand, when the distinctive-region is detected at Step S10 ("Yes" at Step S10), the focus detecting range setting unit 22 sets, at a position of distinctive-region, the focus detecting range of the subsequent frame (Step S12). For example, as illustrated in FIG. 6A, the focus detecting range setting unit 22 sets, at the position of a distinctive-region H(n), a focus detecting range W(n+1) of the subsequent frame.

At Step S14, for example, by the manner illustrated in FIGS. 4A-4C, the imaging control unit 16 determines, whether or not the displacement amount of the focus detecting range and the distinctive-region are larger than threshold value. For example, the imaging control unit 16 determines whether or not the displacement amount from the focus detecting range W(n) used in the frame F(n) to the focus detecting range W(n+1) set at the frame F(n+1) is larger than the reference value. If the displacement amount is smaller than the reference value ("No" at Step S14), the imaging control unit 16 controls an imaging in the same manner that the normal continuous auto-focus is performed (Step S16). At this time, for example, if the focused-status is not detected in the focus detecting range W(n), single auto-focus is performed, then Step S18 will be executed. On the other hand, if the displacement amount is larger than the reference value ("Yes" at Step S14), Step S16 is skipped, that is, the single auto-focus is not performed, even when the focused-status is not detected in the focus detecting range W(n), and then Step S18 will be executed.

At Step S18, the imaging control unit 16 determines whether or not, a start command for imaging is input, in case of imaging a still-image, or, an abort command for imaging is input, in case of imaging a moving-image. Then, in case of imaging a still-image or aborting imaging a moving-image is commanded ("Yes" at Step S18), the imaging control unit 16 performs process for imaging a still-image or aborting imaging a moving-image (Step S20). For example, the imaging control unit 16 stores an imaged image data of a still-image or imaged image data of the moving-image into the external storage medium. Then, the processes are finished. On the other hand, in case that imaging a still-image or aborting imaging a moving-image is not commanded ("No" at Step S18), returning to Step S2, the imaging control unit 10 receives the imaged image data of the subsequent frame.

Then, in the subsequent frame F(n+1) (FIG. 6A), the focused-status of the focus detecting range W(n+1) is detected (Step S4). Then, the minified image data P(n+1) is generated (Step S6). Then, if the distinctive-region H(n+1) is detected ("Yes" at Step S10), the focus detecting range W(n+2) of the subsequent frame F(n+2) is set at the position of distinctive-region H(n+1) (Step S12). Then, at Step S14, a determination based on the displacement amount from focus detecting range W(n+1) to the focus detecting range W(n+2) is performed. Here, if the distinctive-region is detected in frame F(n+1), and the displacement amount is smaller than the reference value, Step S16 is performed. That is, when the focus detecting range W(n+1) is not in the focused-status, the single auto-focus is performed .

On the other hand, the displacement amount of the focus detecting range is larger than the reference value ("No" at Step S14), a performance of the continuous auto-focus at Step S16 is aborted. And, if a still-image is not imaged, or the imaging a moving-image is not finished ("No" at Step S18), the subsequent process cycle will be performed.

By the above described operation steps, when an object displaces along the focus direction and becomes defocused, and no distinctive-region is detected in a frame, the single auto-focus is performed by using the focus detecting range of the initial setting. On the other hand, in case that an object displaces along the vertical direction to the focus direction with consistent focal length, and is in focused-status included in a frame, the focus detecting range is set to follow the object. Then, even when the focus detecting range is not in the focused-status, the single auto-focus is not performed, therefore a situation that the object is included in the frame but is defocused is avoided. Then, when the distinctive-region is not detected ("No" at Step S10), the single auto-focus is performed for the focus detecting range at the center of the frame, and the continuous auto-focus will be performed with the object being focused. Thus, an imaged image, in which an object is constantly focused, can be obtained.

In a variation of the above steps, for example, when the displacement amount from the focus detecting range W(n) to the W(n+1) in the frame F(n) is larger than the reference value ("Yes" at Step S14), at Step S4 in the subsequent process cycle, the focus detecting unit 12 detects, in the imaged image data of frame F(n+1), not the focus detecting range W(n+1), but the focused-status of the focus detecting range W(n). At this time, for example, the focus detecting range setting unit 22 outputs to the focus detecting unit 12 a control signal to set the focus detecting range W(n). In case that an object displaces largely in an unexpected fashion, such a probability that an object is not included in the focus detecting range W(n+1) which is supposed to follow the object, and that the object rather returns to the position of the focus detecting range W(n) used in the previous frame, is large. For example, such a case is applicable that a person shakes his/her face from right to left. Therefore, in the variation, since the probability that the object returns to the focus detecting range and in the focused-status is large, the continuous auto-focus is restored more accurately than a case of making the focus detecting range follow the object.

As explained above, in accordance with the present embodiment, even in case that the object displaces largely, an imaged image in which an object is consistently focused is obtained.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of the superiority and inferiority of the embodiments. Although the embodiments of the present invention have been described in detail, it should be understood that the various changes, substitutions, and alterations could be made hereto without departing from the spirit and scope of the invention.

What is claimed is:
1. An imaging control unit comprising:
  a detecting unit that detects, for each frame, if a focus detecting range set in a frame of an imaged image data is in a focused-status or not based on the image data in the focus detecting range;
  a setting unit that sets, at a position of a distinctive-region including a distinctive points of an object detected from an processed image data which is generated through an image processing to the imaged image data of a first frame being processed, a focus detecting range of an imaged image data of a second frame subsequent to the first frame; and a control unit that, when the focus detecting range of the first frame is not in focused-status, performs a focal length control to change a focal length of an imaging lens so that the focus detecting range is in focused-status, if a displacement amount from the focus detecting range set to the first frame to the distinctive-region detected in the processed image data which is generated through the image processing to the imaged image data of the first frame is not larger than a reference value, and aborts performing the focal length control, if the displacement amount is larger than the reference value, even when the focus detecting range is not in focused-status.

2. The imaging control unit according to claim 1, wherein the processed image data is obtained by minifying the imaged image data.

3. The imaging control unit according to claim 1, wherein the processed image data is provided from an external processing apparatus.

4. The imaging control unit according to claim 1, wherein the distinctive-region is detected by an external processing apparatus from the processed image data .

5. The imaging control unit according to claim 1, wherein the displacement amount is a displacement amount from a first focus detecting range set to an imaged image data of a first frame to a second focus detecting range set to an imaged image data of a second frame subsequent to the first frame.

6. The imaging control unit according to claim 5, wherein the displacement amount from the first focus detecting range to the second focus detecting range is an amount which is inversely proportional to an area of an overlapping region of the first focus detecting range and the second focus detecting range.

7. The imaging control unit according to claim 5, wherein the displacement amount from the first focus detecting range to the second focus detecting range is an amount which is inversely proportional to a ratio of an area of an overlapping region of the first focus detecting range and the second focus detecting range to an area of the first focus detecting range.

8. The imaging control unit according to claim 1, wherein when the displacement amount of a first focus detecting range set to the imaged image data of the first frame to the distinctive-region detected in the processed image data of the first frame is larger than the reference value, at the imaged image data of the second frame subsequent to the first frame, the detecting unit detects the focused-status of the first focus detecting range.

9. The imaging control unit according to claim 1, wherein when a displacement amount from the focus detecting range set to the imaged image data to the distinctive-region detected from processed image data of the imaged image data is larger than the reference value, and the distinctive-region is not detected from the imaged image data of the subsequent frame, the control unit performs the focal length control.

10. An imaging apparatus including an imaging lens and the imaging control unit of claim 1.

11. An imaging control method comprising:

detecting, for each frame, if a focus detecting range set in a frame of an imaged image data is in a focused-status or not based on the image data in the focus detecting range;

setting, at a position of a distinctive-region including a distinctive points of an object detected from an processed image data which is generated through an image processing to the imaged image data of a first frame being processed, a focus detecting range of an imaged image data of a second frame subsequent to the first frame; and when the focus detecting range of the first frame is not in the focused-status, performing a focal length control to change a focal length of an imaging lens so that the focus detecting range is in focused-status, if a displacement amount from the focus detecting range set to the first frame to the distinctive-region detected in the processed image data which is generated through the image processing to the imaged image data of the first frame is not larger than a reference value, and aborting the performing of the focal length control the displacement amount is larger than the reference value, even when the focus detecting range is not in focused-status.

* * * * *